(Model.)

E. G. DORCHESTER.
CARTRIDGE LOADER.

No. 387,556.

Patented Aug. 7, 1888.

Fig. 1

WITNESSES:
C. Bendixon
H. P. Denison.

INVENTOR,
Edward G. Dorchester
BY
Dinell, Laass & Duell
ATTORNEYS, (Model.)

E. G. DORCHESTER.
CARTRIDGE LOADER.

No. 387,556. Patented Aug. 7, 1888.

WITNESSES:

INVENTOR.
Edward G. Dorchester
BY

ATTORNEYS.

(Model.)

E. G. DORCHESTER.
CARTRIDGE LOADER.

No. 387,556. Patented Aug. 7, 1888.

Fig. 3.

WITNESSES:
C. Bendixon
H. P. Denison.

INVENTOR,
Edward G. Dorchester
BY
Duell, Lass & Duell
ATTORNEYS.

(Model.)

E. G. DORCHESTER.
CARTRIDGE LOADER.

No. 387,556. Patented Aug. 7, 1888.

Fig. 4

WITNESSES:

INVENTOR,
Edward G. Dorchester
BY
ATTORNEYS.

(Model.) 6 Sheets—Sheet 5.

E. G. DORCHESTER.
CARTRIDGE LOADER.

No. 387,556. Patented Aug. 7, 1888.

Fig. 5

WITNESSES:
INVENTOR,
Edward G. Dorchester.
BY
ATTORNEYS.

(Model.) 6 Sheets—Sheet 6.

E. G. DORCHESTER.
CARTRIDGE LOADER.

No. 387,556. Patented Aug. 7, 1888.

WITNESSES:
C. Bendixon
H. P. Denison

INVENTOR,
Edward G. Dorchester
BY
Dudly, Laass & Hull
ATTORNEYS.

UNITED STATES PATENT OFFICE.

EDWARD G. DORCHESTER, OF GENEVA, NEW YORK.

CARTRIDGE-LOADER.

SPECIFICATION forming part of Letters Patent No. 387,556, dated August 7, 1888.

Application filed February 21, 1887. Serial No. 228,302. (Model.)

*To all whom it may concern:*

Be it known that I, EDWARD G. DORCHESTER, of Geneva, in the county of Ontario, in the State of New York, have invented new and useful Improvements in Cartridge-Loaders, of which the following, taken in connection with the accompanying drawings, is a full, clear, and exact description.

This invention consists in a novel organization of a machine designed for expeditiously, conveniently, and accurately loading cartridges or shells for fire-arms, as hereinafter fully described, and specifically set forth in the claims.

The invention is fully illustrated in the annexed drawings, in which.

Similar letters of reference indicate corresponding parts.

Figure 5:
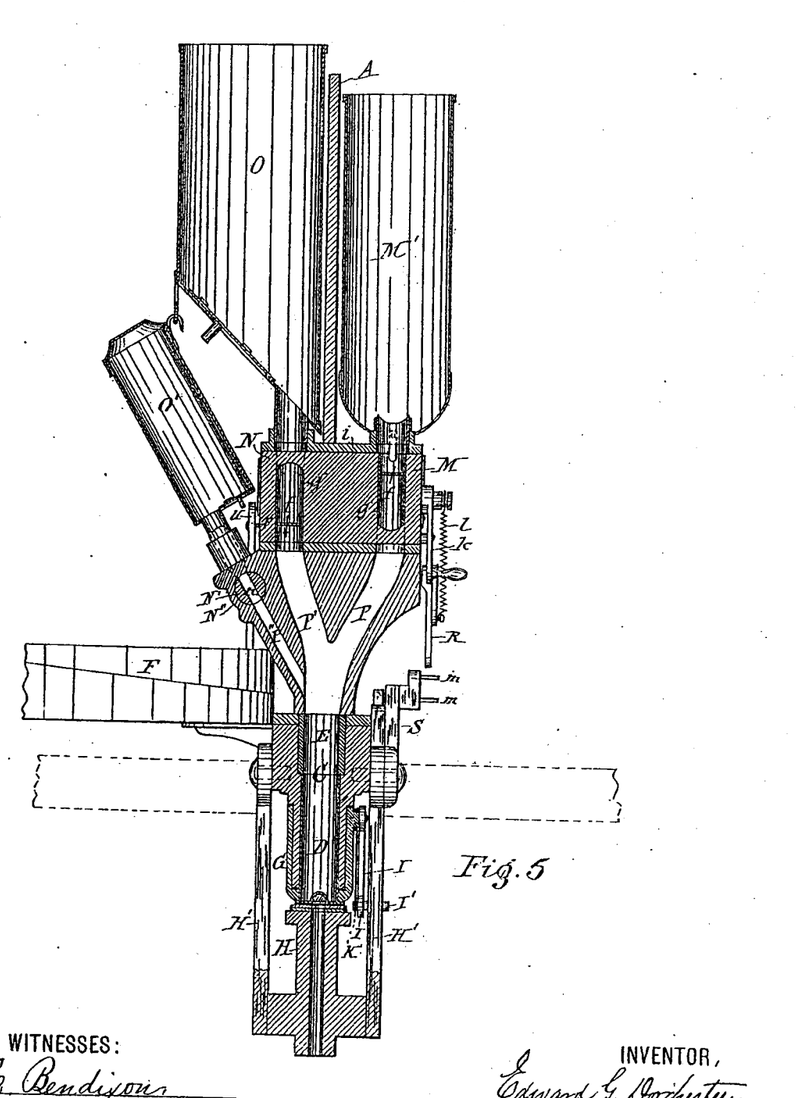
Fig. 5 is a vertical longitudinal section taken on the lines of the cartridge-receiver and ammunition-ducts leading thereto.

A represents the main frame of the cartridge-loader, which frame is of the form of an upright standard provided at its base with a suitable clamp, B, by which to secure it to a table or other suitable support. To the front of said base is secured in a vertical position the cartridge-receiver C, which is preferably of the form of a tube of proper size to contain a cartridge or shell, D, and a thimble, E, above the upper end of the shell, as illustrated in Fig. 5 of the drawings, the interior of said thimble being flush with the interior of the cartridge or shell to guide the ammunition and waddings thereto. From the upper end of the rear portion of the cartridge-receiver projects a breast, C', and from the front portion of the aforesaid end of the cartridge-receiver projects a shelf, F, upon which to place the waddings.

Under the lower end of the cartridge-receiver C of the form of cylinders is arranged removably the cartridge-supporter H, which I preferably provide with hangers H', by which I hinge it on the sides of the receiver C, so as to allow the said supporter to oscillate to and from the lower or receiving end of the receiver.

G represents the cartridge-extractor, consisting of a sleeve sliding on the lower end portion of the receiver. On the bottom portion of the frame A is pivoted a bell-crank, I, one arm of which is connected with the aforesaid cartridge-extractor, and the other arm has projecting from its side a pin, I', which is adapted to be encountered by the hanger-arm H' of the cartridge-supporter when swung from under the cartridge-receiver C, as represented by dotted lines in Figs. 2 and 3 of the drawings.

By pressing the hanger-arm H' against the pin I' the bell-crank I is caused to push the extractor G downward sufficiently to start the cartridge out of the receiver C and allow it to either drop therefrom or to be easily removed by hand. The bell-crank I is under the restraint of a suitable spring, K, which causes it to automatically restore the extractor to its elevated or normal position on the cartridge-receiver simultaneously with the movement of the cartridge-supporter to its requisite position under the cartridge-receiver.

K' is another spring secured to the frame A and adapted to press on the upper end of one of the hanger-arms H' in such a manner as to partially lock the supporter H in its two positions under the cartridge-receiver and removed therefrom.

P P' P'' are ammunition-ducts, which converge and lead to the upper end of the cartridge-receiver C.

M and N represent, respectively, the shot-charger and the main powder-charger, which are arranged axially in line with each other and are united or formed in one piece, so as to turn synchronously in annular or cylindrical seats $i$. Said chargers have their chambers $f f$ extending diametrically through them and disposed at different angles in relation to each other, so that while one is in communication with one of the ammunition-ducts the other chamber is out of communication with the other duct.

M' and O denote the shot-receptacle and main powder-receptacle, which communicate, respectively, with the shot-charger M and powder-charger N. In the chambers $f\,f$ are arranged the gages $g\,g$, which are adapted to slide longitudinally therein, and thus regulate the depth of the chambers according to the size of the charges desired. Said gages are provided with perforations at different points of the lengths thereof, and to the ends of the chargers M and N are secured spring-plates $h$, the free ends of which are adapted to enter the perforations of the gages, and thus retain the latter in their required positions.

In order to prevent the shot from entering between the shot-charger M and its seat $i$ and clogging said charger, I provide the latter with a groove, $g'$, extending from the shot-chamber $f$ part way around the periphery of the charger, and secure to the shell of the seat $i$ a scraper, $e$, which projects into the groove $g'$, by which the shot-receptacle M' communicates with the shot-charger M. Through the upper part of the aforesaid shell I introduce a lug, $d$, which is forced inward and held with its inner end in the groove $g$ by a spring, $d'$, pressing on the outer end of said lug. Said scraper and lug prevent the shot from following the charger M during its movements, and thus obviate the danger of clogging the same.

The chargers M and N, I operate automatically with the movement of the cartridge-supporter H by the instrumentality of the following mechanism: To the end of one of the chargers—preferably the shot-charger M—I attach a crank, $k$, to which I pivot an arm, R, which is formed at its pivoted end with a lateral extension, R', and has its opposite and free end formed with a hook, R". The end of the extension R' is connected with a stud projecting from the axis of the charger M by a spring, $l$, which causes the free or hook end of the arm R to be drawn upward and normally rest against a pin or projection, $m'$, on the frame below the charger M.

Figure 1:
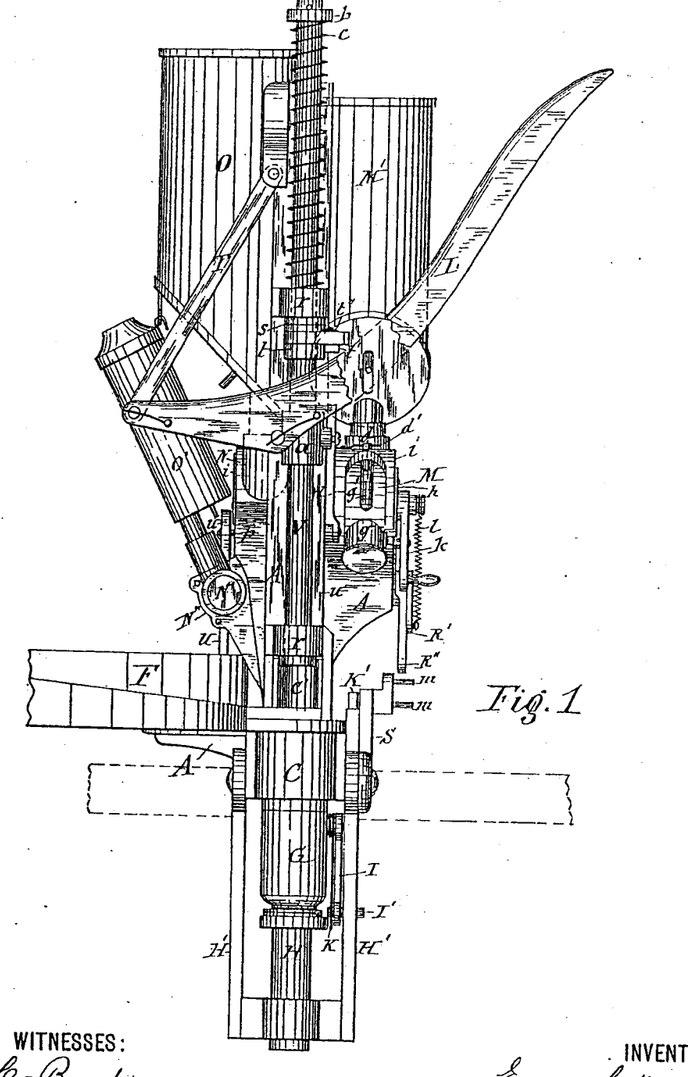
Figure 1 is a front elevation of my improved cartridge-loader.
Figures 2, 10:
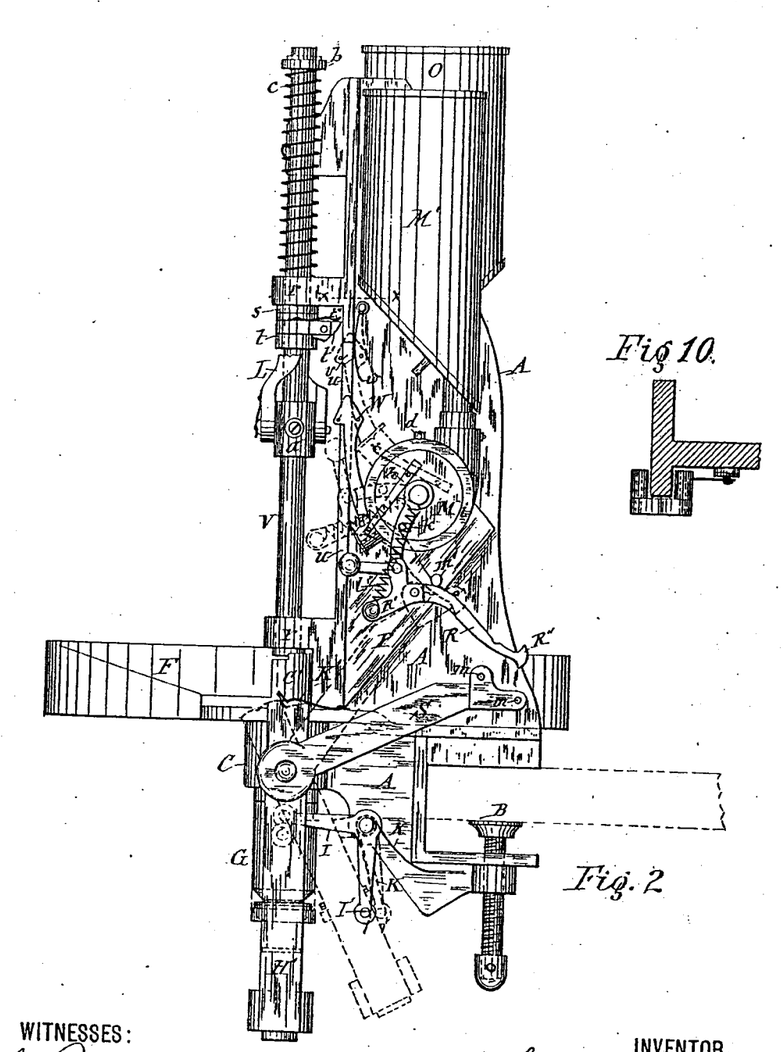
Figs. 2 and 3 are right and left side elevations, respectively.
Fig. 10 is a transverse section taken on line $x$ $x$, Fig. 2.

To the hanger-arm H' of the cartridge-supporter H, I rigidly attach an arm, S, the free end of which reaches under the end of the arm R, and is provided with laterally-projecting pins $m\,m$, between which the hook end of the arm R is adapted to enter when the cartridge-supporter H is swung completely from under the cartridge-receiver C, and the ammunition-chargers are turned into position to receive the powder and deliver the shot, as represented by dotted lines in Fig. 2 of the drawings. The outer face of the hook R' is beveled, so as to allow the outer pin, $m$, of the arm S to slip over said hook and engage therewith. The cartridge-supporter is swung into the aforesaid position to allow the cartridge or shell to be introduced into the receiver C from the lower end thereof, then the supporter H is swung to its requisite position under the receiver to support the cartridge or shell therein, and in this latter movement of the supporter the arm S thereof draws down the arm R, and thereby turns the ammunition-chargers M N, so as to deliver the charge of powder from the charger N into the duct P', which conveys said powder into cartridge or shell D' in the receiver C, while the shot-charger is in position to receive shot from the receptacle M'. The hook R' is of such a shape as to cause it to lose its hold on the pin $m$ immediately before the cartridge-supporter arrives at its requisite position under the receiver.

In connection with the aforesaid powder-charger O, I use a priming-charger, N', which consists of a longitudinally-reciprocating block sliding in a case, N", to the top of which the can O', containing the priming-powder, is attached. A duct, P", leads from the bottom of the case N" to the cartridge-receiver C, as illustrated in Fig. 5 of the drawings.

Figure 3:
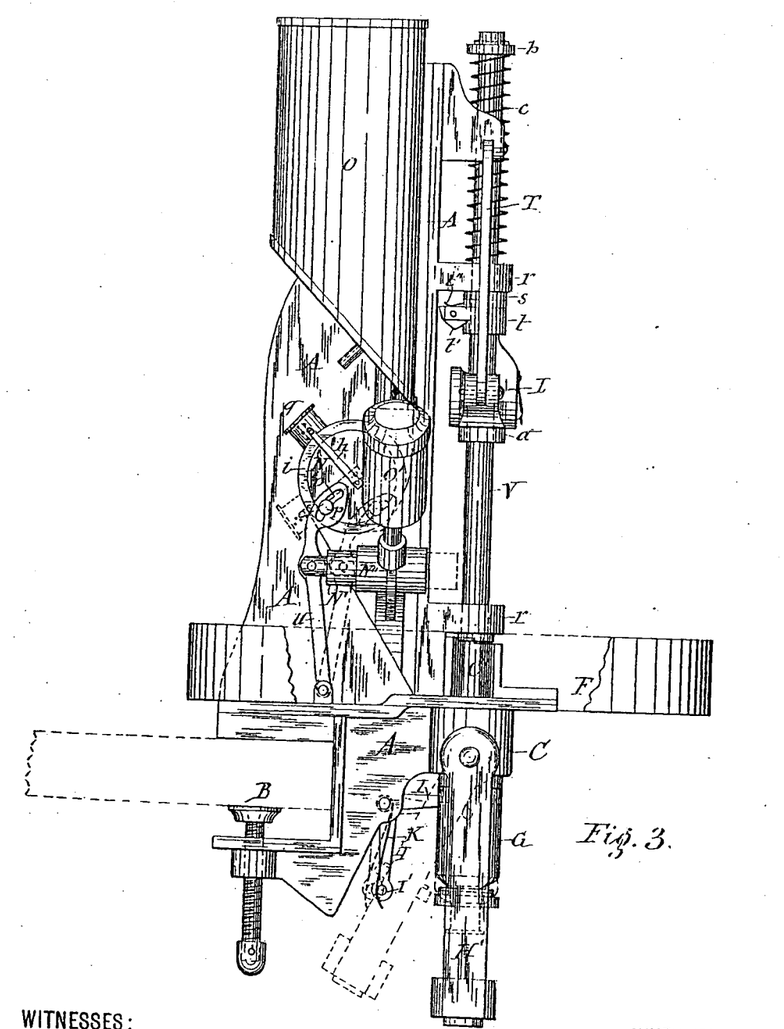
Figure 4:
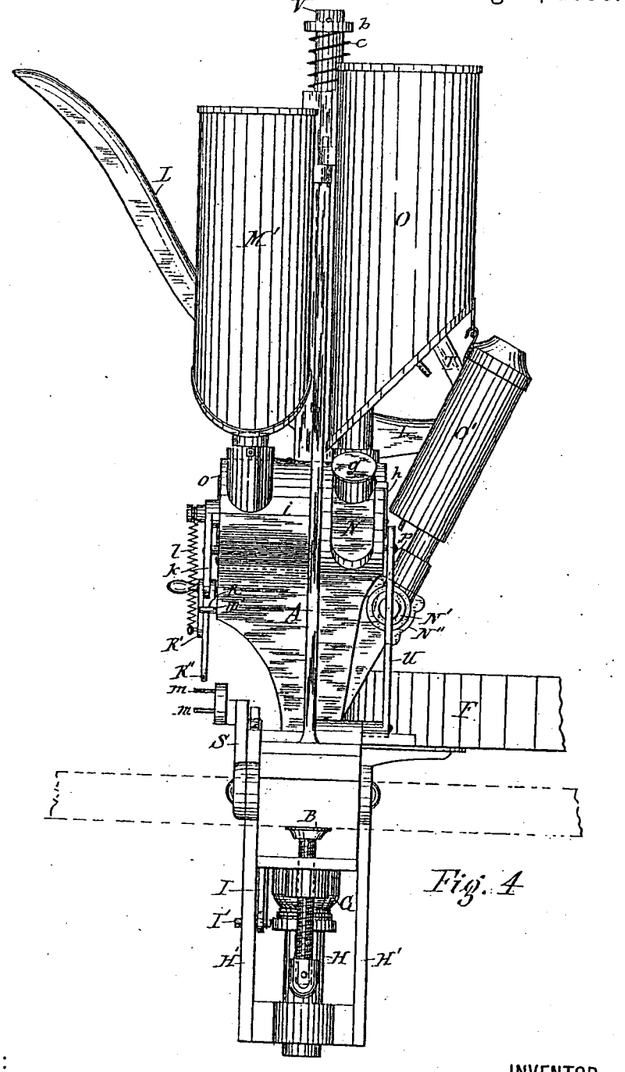
Fig. 4 is a rear elevation of the same.
Figures 6, 7, 8, 9:
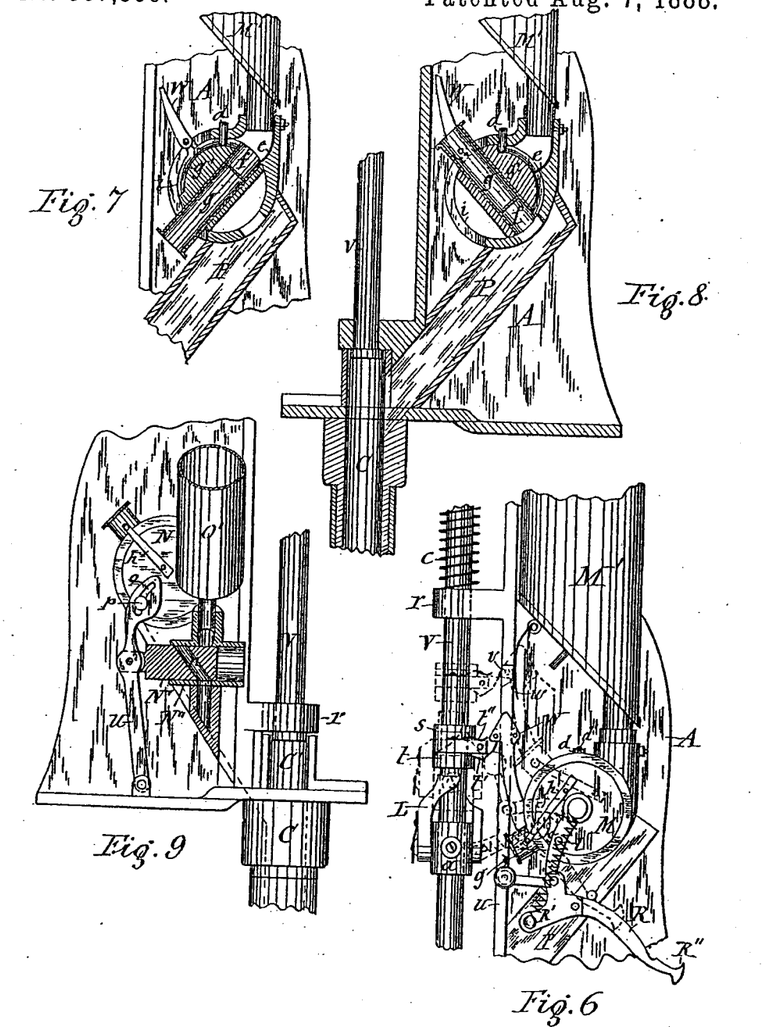
Fig. 6 is a side view showing in different positions the mechanisms which transmit motion to the ammunition-chargers.
Figs. 7 and 8 are sectional views of the shot-charger, showing the same in positions for receiving the shot and for delivering the same to the cartridge.
Fig. 9 is a sectional view of the priming-charger.

The charger N' is provided with a diagonal channel, $n$, as shown in Fig. 9 of the drawings, which channel constitutes the chamber for delivering the priming-powder in measured quantities to the cartridge-receiver. The diagonal disposition of the channel $n$ causes the upper end thereof to be out of communication with the can O', while the lower end of said channel coincides with the duct P". This priming-charger I cause to operate automatically and slightly in advance of the main powder-charge N by means of a lever, U, pivoted at one end on the frame A and connected intermediate its length to the priming-charger N', and having in its opposite end a slot, $o$, through which passes a stud-pin, $p$, secured to the end of the main powder-charger N eccentrically in relation to the axis of the latter, as shown in Figs. 3 and 9 of the drawings. In turning the main powder-charger into the position to deliver the powder to the cartridge-receiver C, the lever U is caused to move the priming-charger N' into the requisite position to deliver the priming-powder to the cartridge-receiver slightly in advance of the delivery of the other powder from the main charger N.

V represents the ramrod, which is arranged vertically over the cartridge-receiver C, and is guided in eyes $r\,r$, secured to the front of the upright frame A. Said ramrod is supported in an elevated position by means of a spiral spring, $c$, surrounding the upper end portion of the ramrod and bearing with one end on the upper eye, $r$, and with the opposite end against a collar, $b$, secured to the ramrod.

L denotes the operating-lever of the ramrod, which lever is adjustably connected with the ramrod by means of a sleeve, $a$, adapted to slide longitudinally on the ramrod and clamped in its desired position by means of a set-screw passing through the sleeve, and on this sleeve the lever L is pivoted. The short arm of the said lever is connected with the lower end of a toggle, T, pivoted at its upper end to the upper part of the frame A. By depressing the free end of the lever L the ramrod is forced down into the cartridge-receiver C, and during this movement the toggle T approaches a vertical position and comes nearly in line with the lever, and thus greatly increases the power of the lever. A cushioned stop, s, attached to the ramrod and colliding with the under side of the upper guide-eye, r, serves to arrest the ramrod in its upward movement after the lower end thereof has been withdrawn from the cartridge-receiver sufficiently to allow the waddings to be passed from the shelf F into the aforesaid receiver.

To the ramrod V, I also attach a collar, l, on which I pivot a cam, t', which is restrained from yielding to downward pressure by a heel-extension of said cam projecting under the collar, and its upward movement is slightly resisted by a spring, t'', pressing on top of the cam. The function of said cam is to engage with a hooked arm, W, which is hinged on the rotatable ammunition-charger M, and has its free end guided on guides u on the front of the frame A and parallel with the ramrod V. The said hooked arm is drawn down simultaneously with the turning of the ammunition-chargers M N into the position to deliver the charge of powder into the receiver C, as illustrated by full lines in Fig. 2 of the drawings. The operator, having subsequently placed the wad over the receiver C, then depresses the ramrod V to force the wad into cartridge or shell. In the descent of the ramrod the cam t' slips over the hook W, and in withdrawing or raising the ramrod the aforesaid cam engages the hook and draws the same up with it, and thereby turns the ammunition-chargers M N into such positions as to cause the charge of shot to be delivered to the cartridge-receiver and the powder-charger N to receive a new charge of powder from the can or receptacle O. Immediately below the point where the cam t comes to a rest the guide u is terminated or provided with a notch, v, which causes the hook W to loose its hold on the guide and allows it to slip off from the cam t'. The said hook is thus free to be again drawn down by the turning of the ammunition-chargers M N, produced by the swinging of the cartridge-supporter H from the cartridge-receiver C, in the manner hereinbefore described. However, before moving the cartridge-supporter, as last mentioned, the operator places the wad over the upper end of the receiver C and forces the same down on top of the shot in the cartridge by depressing the ramrod, which subsequently resumes its elevated position. Back of the notch v is a spring, w, which bears on the hook W and serves to guide the same back to its position on the guide u.

Having described my invention, what I claim as new, and desire to secure by Letters Patent, is—

1. In a cartridge-loader, the combination, with a stationary upright cartridge-receiver having its receiving end at the base, of hangers hinged to opposite sides of said receiver and a cartridge-supporter attached to the lower ends of said hangers, substantially as described and shown.

2. In a cartridge loader, the combination, with the stationary upright cartridge-receiver having its receiving end at the base and a cartridge-supporter arranged movably under the cartridge-receiver, of a cartridge-extractor sliding longitudinally on the said receiver, substantially as described and shown.

3. In a cartridge-loader, the combination of an upright cartridge-receiver having its receiving end at the base, a cartridge-extractor at said receiving end, a cartridge supporter arranged removably under the receiver, and a lever for transmitting motion from the supporter to the extractor, as and for the purpose set forth.

4. The combination, with the upright cartridge-receiver having its receiving end at the base, of a cartridge-extractor sliding on said receiver, a cartridge-supporter suspended from the receiver and adapted to swing to and from the receiving end thereof, and a lever arranged to transmit motion from the supporter to the extractor, substantially as set forth.

5. The combination, with the upright cartridge-receiver having its receiving end at the base, of a cartridge-extractor sliding longitudinally on the receiver, a cartridge-supporter suspended from the receiver and adapted to swing to and from the receiving end thereof, a bell-crank having one of its arms connected with the extractor and the other arm adapted to be encountered by the swinging cartridge-supporter, and a spring for sustaining the extractor in its normal position, substantially as and for the purpose set forth.

6. In combination with the cartridge-receiver having its receiving end at the base, an extractor sliding longitudinally on said receiver, a cartridge-supporter hinged on the receiver, a bell-crank having one of its arms connected with the extractor and the other arm adapted to be encountered by the swinging supporter, and a spring to partially lock said supporter at the extremes of its motion, substantially as described and shown.

7. In a cartridge-loader, the combination, with the cartridge-receiver, of a cartridge-supporter arranged movably to and from the receiving end of said receiver, a powder-duct leading to said receiver, a powder-charger arranged movably in and out of communication with said duct, a powder-receptacle communicating with the aforesaid charger, and levers transmitting motion from the cartridge-supporter to the powder-charger and throwing the latter in communication with the aforesaid duct simultaneously with the movement of the cartridge-supporter to the cartridge-receiver, substantially as set forth.

8. In a cartridge-loader, the combination, with the cartridge-receiver, of ducts leading to said receiver, a main powder-charger arranged movably in and out of communication with one of the ducts, a priming-charger arranged movably in and out of communication with the other duct, and a lever arranged to transmit motion from the main charger to the priming-charger and move the latter to its delivering position in advance of the former, as set forth.

9. In combination with the cartridge-receiver and ducts leading thereto, an oscillatory main powder-charger, a reciprocating priming-charger, and a lever arranged to transmit motion from the oscillatory charger to the reciprocating charger, as set forth and shown.

10. In combination with the cartridge-receiver and a duct leading thereto, a reciprocating charger having a diagonal ammunition-channel adapted to communicate at one end with the duct, and an ammunition-receptacle having a discharge spout in the path of the opposite end of the channel of the charger, substantially as described and shown.

11. In combination with the cartridge-receiver and oscillatory ammunition-chargers communicating with said receiver, an oscillatory cartridge-supporter under the receiver, an arm projecting from the cartridge-supporter, a crank on the aforesaid charger, and an arm connected to the said crank and adapted to engage and release the arm of the cartridge-supporter, substantially as and for the purpose set forth.

12. In combination with the cartridge-receiver and oscillatory ammunition-chargers communicating with said receiver, an oscillatory cartridge-supporter under the receiver, an arm projecting from said supporter and provided with laterally-projecting pins at its free end, a crank attached to the chargers, an arm pivoted on said crank and provided at its pivoted end with a lateral extension and having its free end provided with a hook adapted to enter between the aforesaid pins of the cartridge-supporter arm, and a spring connecting the lateral extension of the pivoted arm with the axis of the chargers, substantially as described and shown.

13. In combination with the cartridge-receiver, ramrod, and oscillatory ammunition-charger, a hook hinged on the said charger, a guide parallel with the ramrod and guiding the free end of the aforesaid hook, and a cam hinged on the ramrod yielding upwardly, but restrained from yielding to downward pressure, and adapted to engage the aforesaid hook during the upward movement of the ramrod, substantially as described and shown.

14. In combination with the cartridge-receiver, ramrod, and oscillatory ammunition-charger, a hook hinged on said charger, a guide parallel with the ramrod and guiding the free end of the aforesaid hook and provided with a notch for the release of the hook, a spring pressing the hook toward the ramrod, and a cam hinged on the ramrod and restrained from yielding to downward pressure and adapted to engage the hook during the upward movement of the ramrod, substantially as described and shown.

15. In combination with the upright frame provided with the cartridge-receiver at its base and the ramrod sliding on said frame, the sleeve $a$, adapted to be clamped on the ramrod at different points in the length thereof, the toggle T, connected with the frame, and the lever L, pivoted on the aforesaid sleeve and connected with the toggle, substantially as described and shown.

16. The combination of the frame A, provided with the cartridge-receiver at its base and with guide-eyes above said receiver, the ramrod sliding in said eyes and provided with the collar $b$, the spring $c$, interposed between the said collar and one of the guide-eyes on the frame, a cushioned stop on the ramrod under the said guide-eye, the toggle T, connected to the frame, and the lever L, pivoted on the ramrod and connected with the toggle, substantially as described and shown.

17. In combination with the frame A, provided with the cartridge-receiver at its base and powder and shot ducts converging to said receiver, oscillatory powder and shot chargers arranged axially in line with each other and united to turn synchronously and having their delivering end in different positions in relation to each other, a reciprocating priming-charger communicating with the powder-duct, a lever pivoted at one end on the frame and connected intermediate its length with the priming-charger and slotted at its opposite end, and a stud-pin passing through the slotted end of said lever and secured to the end of the powder-charger eccentrically in relation to the axis of the latter, substantially as described and shown.

18. In combination with the annular charger-seat communicating with the ammunition-duct and the shot-receptacle communicating with said seat, the oscillatory shot-charger in the aforesaid seat and provided with the diametrical shot-chamber and with a groove extending from said shot-chamber part way around the periphery of the charger, and the lug $d$, projecting into said groove, substantially as and for the purpose set forth.

19. In combination with the annular charger-seat and communicating with the ammunition-duct and the shot-receptacle communicating with said seat, the oscillatory shot-charger in the aforesaid seat and provided with the diametrical shot-chamber and with a groove extending from said shot-chamber part way around the periphery of the charger, and the scraper $e$, projecting into the aforesaid groove, substantially as and for the purpose set forth.

20. In combination with the ammunition-charger having the chamber $f$ extending through it, the gage $g$, seated movably in said chamber and provided with perforations at different points of its length, and the spring-plate h, secured to the end of the charger and having its free end adapted to enter the perforation of the gage, substantially as described and shown.

In testimony whereof I have hereunto signed my name and affixed my seal, in the presence of two attesting witnesses, at Syracuse, in the county of Onondaga, in the State of New York, this 18th day of February, 1887.

EDWARD G. DORCHESTER. [L. S.]

Witnesses:
C. BENDIXON,
H. P. DENISON.